Patented Feb. 20, 1951

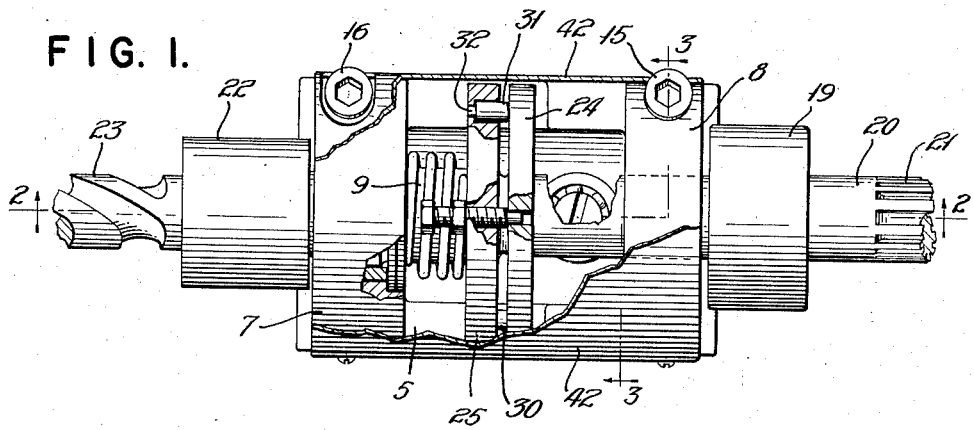

2,542,408

UNITED STATES PATENT OFFICE 2,542,408

DRILL SPEEDER AND THE LIKE

George O. Gridley, Berlin, Conn., assignor to The New Britain Machine Company, New Britain, Conn., a corporation of Connecticut Application August 30, 1947, Serial No. 771,548

9 Claims. (Cl. 74—56)

My invention relates to drill heads and the like and in particular to feed mechanisms therefor.

In machines such as drilling machines, it frequently occurs that for a particular feed and cutting speed excessively long chips are produced. These chips may not only interfere with parts of the machine but may also endanger the safety of an operator.

It is, accordingly, an object of my invention to provide an improved feed mechanism which when applied to a machine of the character indicated will inherently prevent the production of chips of dangerous size.

It is a further object to provide an improved feed mechanism which in application to a machine of the character indicated will periodically break up chips produced by the tool which it carries.

It is a specific object to provide an improved tool head incorporating in itself a mechanism which will superpose an inherently intermittent action on whatever feed is imparted to it.

Other objects and various further features of the invention will be pointed out or will occur to those skilled in the art from a reading of the following specification in conjunction with the accompanying drawings. In said drawings:

Fig. 1 is a partly broken-away plan view of a tool holder incorporating features of the invention;

Fig. 2 is a vertical sectional view of the device of Fig. 1; and

Fig. 3 is a sectional view taken substantially in the plane 3—3 of Fig. 1.

Broadly speaking, my invention contemplates an improved feeding mechanism which, in application to a rotating machine such as a lathe, may inherently superpose an intermittent feed action upon the normal feed for the tool holder relatively to the work, for the purpose of producing small and relatively harmless chips. The intermittent feed action may be derived from a plate having a generally radial surface which may be adjustably inclined with respect to the axis of the tool or of its spindle. This inclined surface produces a cam having an axial throw, and a cam follower may ride over this cam. In the form to be described, the tool-carrying spindle or shaft carries the adjustable cam, and the cam-follower means is carried by the body of the tool holder in which the shaft is journalled.

Referring to the drawings, my invention is shown in application to a tool holder having a body 5 to be secured, say, in a tool slide 6. The tool slide 6 may form part of an automatic lathe and will be understood to receive normal feeds, say, in the right-to-left direction, in the sense of Figs. 1 and 2. The body 5 may include two spaced generally upright shaft-supporting portions or standards 7—8 in which a tool-supporting spindle or shaft 9 may be journalled, as at 10—11. In the form shown, the shaft 9 is journalled in standards 7—8 in bushings 12—13. The tool holder 5 may be adjustably positioned longitudinally in a slot 14 in the tool slide 6, and any selected position in this slide 6 may be secured, as by the take-up of bolts 15—16. In the form shown, the bolts 15—16 are threaded to a movable element 17 of the dovetail 18 of body 5, so that a tightening of bolts 15—16 will effectively broaden the dovetail 18 and wedge the same in slot 14.

The tool-supporting spindle or shaft 9 may include at one end a chuck or coupling 19 for engagement with a drive shaft 20. The shaft 20 preferably has a splined end, as at 21, for permitting axial lost motion with respect to the rotary drive means (not shown) with which the splines 21 are to fit. The other end of shaft 9 may carry suitable chucking means for holding a tool, such as a drill bit 23.

In accordance with the invention, cam means having an axial throw is interposed between the shaft 9 and the body of tool holder 5 for imparting intermittent axial reciprocation to shaft 9 and hence to the drill 23. Such axial throw may be derived from a plate 24 which may be adjustably positioned for inclination with respect to the axis of the shaft 9. In the form shown, the plate 24 is rotatably carried by the shaft 9 and is also inclinably positioned by positioning means 25 fixed to the shaft 9. Cam-follower means 26 may be carried by the body 5. Resilient means such as a compression spring 27 between one of the standards 7 and the positioning member 25 may serve to maintain the cam-follower means 26 in continuous engagement with the inclined or cam surface of plate 24. If desired, washers 28 may be seated against shoulders in the standard 7 to receive the thrust of spring 27.

In the preferred form shown, the positioning means 25 for the cam plate 24 is itself an annular plate fixed as at 29 to shaft 9. The plate 25 may include a plurality of positioning elements which are spaced from the axis of the shaft 9 and which project axially to engage and thus to locate plate 24. In the form shown, there are three of these projecting elements, two of which (30—31) may be fixed by seating them in the bottom of counterbores, as at 32 in plate 25. The third axial positioning element 33 is preferably axially adjustable and may include a shank threaded in plate 25; lock-nut means 34 may secure a threaded adjustment of element 33. In order that the plate 24 may be rotatably carried with the shaft 9, one of the projecting elements 30—31—33 preferably carries a locating pin to engage a hole 35 in plate 24. In the form shown, this locating pin 36 is formed integrally with the adjustable element 33.

As indicated, the cam-follower means 26 may be carried by the body 5 and urged for engagement with the plate 24. In the form shown, the cam-follower means comprises a roll 37 which may be the outer ring of an antifriction bearing, the inner ring 38 of which is fixed to the body 5. A bolt 39 may secure the inner ring 38, with the axis thereof preferably generally normal to the axis of the shaft 9.

In operation, it will be understood that rotary drive for the drill 23 will be imparted to the spindle or shaft 9 through the spline connection 21. Such rotation will cause both plates 24 and 25 to rotate unitarily with the shaft 9, and depending upon the adjustment of the locating element 33, there may be or there may not be axial undulation in the cam surface of plate 34. Whatever undulation or throw there may be, it will be appreciated that the cam-follower roll 26 will serve to make the shaft 9 follow such undulation. It will be clear that if a steady feed is imparted to the tool slide 6 while the shaft 9 is rotated, then the net feed produced on the drill 23 may be intermittent, depending upon the adjustment of element 33.

In order that vibration in the plate 24 may be held to a minimum, I prefer that the cam-follower roll 26 shall contact the cam surface of plate 24 at least over an annularly continuous contact area which is at or within the minimum radial distance $r$ to a line 40 joining two of the positioning elements, say, elements 30—33. Referring to Fig. 3, wherein the dot-dash line 41 presents the limit of part of such annular contact area, it will be seen that there need be no net force applied radially externally of the line 40 so as to produce wobble or chatter during the rotation of plate 24.

It will be appreciated that I have described a relatively simple mechanism which may be utilized to superpose an intermittent feed action on a rotating element such as a drill. The mechanism may be incorporated in a simple tool holder, and all parts may be accessible (as by removal of a cover plate 42) for adjustable selection of the throw of such intermittent feed. If no intermittent feed is desired, the device may be so adjusted.

While I have described my invention in detail for the preferred form shown, it will be understood that modifications may be made within the scope of the invention as defined in the appended claims.

I claim:

1. In a device of the character indicated, a tool head body to be held against rotation, a shaft journalled in said body and including radial flange means, a flat plate facing said flange means and substantially coextensive therewith, a plurality of axial spacer elements between said flange means and said plate for spacing said plate axially from said flange means, one of said plurality of spacer elements projecting further than another of said plurality of spacer elements, whereby said plate may be inclined with respect to said flange means, and cam-follower means carried by said body and riding on said plate, for the purpose described.

2. In a device of the character indicated, a tool head body, a shaft journalled in said body, a flat annular plate loosely carried around said shaft, locating means for said plate and fixedly carried by said shaft, said locating means including axial positioning elements engaging said plate at at least three radially outward and circumferentially spaced points, and cam-follower means carried by said body and engaging said plate substantially within the area bounded by said spaced points.

3. In a device of the character indicated, a tool head body, a shaft journalled in said body, an annular plate around said shaft, axial positioning means for said plate and fixedly carried by said shaft, said axial positioning means including elements axially engaging said plate at at least three radially outwardly located and substantially uniformly circumferentially spaced points, one of said elements being generally axially adjustable, said elements including means engaging said plate to hold said plate against rotation relatively to said shaft, whereby the inclination of said plate with respect to said shaft may be adjusted, and cam-follower means between said plate and said body, said plate having a flat surface upon which said cam-follower means may ride.

4. In a device of the character indicated, a tool head body, said body including two generally upright spaced standards, a shaft including portions journalled in each of said standards, a plate having a substantially flat annular surface around said shaft and between said standards, positioning means for said plate and fixed to said shaft and including means retaining said plate against rotation relatively to said shaft, said positioning means being located between said plate and one of said standards, compressionally resilient means between said one standard and said positioning means, and cam-follower means between said surface and said body and he'd against rotation about the axis of said shaft.

5. In a device of the character indicated, a body having two spaced generally upright shaft-supporting portions, a shaft journalled in said spaced portions, a first annular plate fixed to said shaft, a second annular plate substantially coextensive with said first annular plate, and at least three axial positioning elements including an adjustable element carried by one of said plates at points off the axis of said plates for adjustably inclining said plates with respect to each other, said second plate being held against rotation relatively to said first plate, whereby said second plate may define a cam surface having an axial throw as determined by said positioning elements, and cam-follower means carried by said body and in engagement with said surface substantially within the area bounded by said points.

6. A device according to claim 5, in which resilient means between said body and one of said plates resiliently urges said cam surface and said cam-follower means into engagement.

7. In a device of the character indicated, a body having spaced standards, a shaft journalled in said standards, an annular plate around said shaft, means including circumferentially spaced positioning elements for positioning a substantially flat radial surface of said plate with respect to the axis of said shaft and including means engaging said plate for rotation with said shaft, cam-follower means in engagement with said surface and held against rotation about the axis of said shaft, said cam-follower means being disposed for imparting relative axial reciprocating motion between said body and said shaft depending upon the inclined positioning of said surface, and resilient means urging said cam-follower means and said surface into constant engagement.

8. In a device of the character indicated, a tool head body, said body including two generally upright standards, a shaft journalled in said standards, a first annular plate carrying three axially projecting substantially uniformly circumferentially spaced elements, a second annular plate around said shaft and substantially coextensive with said first plate, said second plate being positioned by said three projecting elements and keyed thereby against rotation relatively to said shaft, and cam-follower means including a roll pivotally supported by said body on an axis transverse to the axis of said shaft, said roll engaging said second plate substantially within the area bounded by said elements.

9. In a device of the character indicated, a substantially flat plate, three angularly spaced axially projecting elements engaging said plate at points radially spaced from an axis for said plate, said elements engaging said plate against rotation relatively to said elements about said axis, a roll, and means constraining said roll to ride on said plate upon relative rotation of said plate and the axis of said roll about said first-mentioned axis, the path of contact of said roll on said plate including substantially circumferentially continuous portions radially inward of lines joining said projecting elements.

GEORGE O. GRIDLEY.

REFERENCES CITED

The following references are of record in the file of this patent:

UNITED STATES PATENTS

| Number | Name | Date |
|---|---|---|
| 1,331,746 | Evensen | Feb. 24, 1920 |
| 2,328,542 | Bates | Sept. 7, 1943 |